Patented Jan. 6, 1931

1,787,887

UNITED STATES PATENT OFFICE

ARTHUR C. WHITE AND CHARLES E. CLASON, OF MIDLAND, MICHIGAN, ASSIGNORS TO THE DOW CHEMICAL COMPANY, OF MIDLAND, MICHIGAN, A CORPORATION OF MICHIGAN

ICE-ROTTING COMPOSITION

No Drawing. Application filed February 8, 1928, Serial No. 252,934. Renewed November 22, 1929.

This invention relates to a composition and the method of preparing the same, being particularly directed to such a composition as has especial utility in destroying ice present in bodies of water.

The destruction of ice in river channels or ship lanes, forebays of water power intakes, and other bodies of water presents quite a problem. Since the ice melting or ice destroying properties of certain deliquescent substances and mineral salts have long been known, this problem has been attacked by introducing common salt, calcium chloride, magnesium chloride, mixtures of the latter two, or similar substances into the bodies of water to destroy the ice therein. However, such substances have a high specific gravity and, therefore, go to the bottom substantially immediately upon being dumped into the water. Their effectiveness is thus lost.

The object of the present invention is to provide an ice rotting composition which will float or remain in suspension in the water.

Other objects and advantages will become apparent as the detailed description proceeds.

In attaining the main object of the invention, it is contemplated to prepare an ice rotting substance so as to have an effective specific gravity less than its theoretical specific gravity. This may be accomplished in various ways, as will later appear.

Although different ice rotting substances may be used in the composition, it has been found that calcium chloride alone, or in combination with magnesium chloride, is admirably suited for such use because of its efficient ice destroying characteristic and its inexpensiveness. It might be stated here that magnesium chloride alone is well adapted for this use except that it is not so easily obtained, or as cheap, as calcium chloride or a mixture of the two.

The production of the composition further includes mixing with the ice rotting substance a material which will enable the substance to float until dissolved, and preferably a solid material as distinguished from a liquid or viscous material. It was found that a light powdered insoluble material might be mixed with the substance in such proportions that the mixture will float. The buoyant material may be wood flour, cork flour, sawdust, or any other similar insoluble light powdered material. Of such materials, however, ground cork or cork flour has been found to be more preferable. A less amount of the cork flour is necessary in the mixture, since the reluctance of cork to wetting results in the persistent confinement of a larger proportion of air, and, hence, an increase in its effective buoyance.

As a specific example of how the composition may be made, it will be explained that when cork flour is mixed with powdered calcium chloride, approximately 82% anhydrous, it is necessary to use only 2½% by weight of the mixture of the flour. The powdered calcium chloride and the cork flour adhere in the form of agglomerated small porous masses or granules, the effective specific gravity of which is less than the theoretical mean specific gravity of the mixture. This lower effective specific gravity or buoyance is occasioned by air being confined in the interstices of the granules. The granules of the mixture will float when thrown into the water and the calcium chloride can exert its ice rotting action adjacent to the surface thereof.

Instead of using calcium chloride, a mixed chloride of magnesium and calcium may be used. It is preferable to provide a partial drying of the normal hydrated salts so that a non-caking product will result. This partial dehydration augments the heat of solution, thus increasing the ice rotting action of the substance.

The calcium or magnesium chlorides, or the salts, should be used in powdered form so that they readily adhere to the particles of ground cork or other light constituent, and the composition mixed in a rotary drum mixer or some other convenient and suitable mixing device.

When the composition is poured through an opening in sheet ice for the purpose of attacking the slush ice in the water below, it will float in the water beneath the sheet ice, there going into solution, attacking the slush ice, and destroying or separating it from the sheet ice.

Although certain preferred ice rotting substances, buoyant materials, and methods of mixing the same to form the composition have been specifically referred to herein, the invention is not intended to be so limited and includes every such composition within the scope of the appended claims.

Having thus described our invention, we claim:

1. A composition consisting of an ice rotting substance and a buoyant material, mixed in such proportions that the composition will float upon water.

2. A composition consisting of an ice rotting substance in powered form and a buoyant material in powdered form, mixed in such proportions that the composition will float upon water.

3. A composition consisting of a mechanical mixture of an ice melting salt and a buoyant material.

4. A composition consisting of an ice melting salt prepared in the form of porous granules which will float upon water.

5. A composition consisting of an ice melting salt prepared in the form of agglomerated particles buoyed with included air.

6. A composition comprising hydrated calcium chloride prepared in the form of agglomerated air including particles or granules which will float upon water.

7. A composition consisting of a mechanical mixture of a powdered water soluble salt and a buoyant material.

8. A composition consisting of a mechanical mixture of a water soluble material and a buoyant material.

9. A composition consisting of a mechanical mixture of a water soluble salt and a powdered buoyant material.

10. A composition comprising a mechanical mixture of a powdered deliquescent water soluble salt and a powdered insoluble buoyant material.

11. A composition consisting of a mechanical mixture of a powdered insoluble buoyant material and a soluble salt mixed in such proportions that the mixture will float upon water.

12. A composition consisting of a mechanical mixture of a finely divided buoyant water insoluble material with a water soluble salt.

13. A composition comprising a mechanical mixture of finely divided cork and powdered calcium chloride.

14. The method of preparing a salt composition consisting in mixing a powdered water soluble salt with a powdered buoyant material so that the salt and the buoyant material adhere in the form of agglomerated air including particles or granules.

15. The method of preparing a salt composition comprising mixing powdered calcium chloride with powdered cork so that these materials adhere in the form of agglomerated air including particles or granules.

16. A composition consisting of an ice melting substance prepared in the form of air including particles.

17. A composition consisting of buoyant granules formed of an ice melting substance and a water repellent solid material.

18. A composition consisting of buoyant granules formed of an ice melting salt and a water repellent solid material.

In testimony whereof, we hereunto affix our signatures.

ARTHUR C. WHITE.
CHARLES E. CLASON.